United States Patent
An et al.

(10) Patent No.: US 7,848,404 B2
(45) Date of Patent: Dec. 7, 2010

(54) CURRENT MODE LOGIC MULTI-TAP FEED-FORWARD EQUALIZER

(75) Inventors: Hongming An, San Diego, CA (US); Wei Fu, San Diego, CA (US); Allen Merrill, Encinitas, CA (US); Keith Michael Conroy, Perkasie, PA (US)

(73) Assignee: Applied Micro Circuits Corporation, San Diego, CA (US)

( * ) Notice: Subject to any disclaimer, the term of this patent is extended or adjusted under 35 U.S.C. 154(b) by 908 days.

(21) Appl. No.: 11/732,908

(22) Filed: Apr. 5, 2007

(65) Prior Publication Data

US 2008/0247453 A1    Oct. 9, 2008

(51) Int. Cl.
*H03K 5/159*   (2006.01)
*H03H 7/40*   (2006.01)
*H03H 7/30*   (2006.01)

(52) U.S. Cl. ...................... 375/233; 375/295
(58) Field of Classification Search ............... 375/229, 375/230, 231, 233, 295; 333/18
See application file for complete search history.

(56) References Cited

U.S. PATENT DOCUMENTS

| | | | | |
|---|---|---|---|---|
| 4,709,278 A | * | 11/1987 | Lagadec | 360/26 |
| 5,719,633 A | * | 2/1998 | Nishio et al. | 348/441 |
| 7,183,842 B1 | * | 2/2007 | Wai et al. | 330/98 |
| 2005/0190873 A1 | * | 9/2005 | Smith et al. | 375/354 |

OTHER PUBLICATIONS

"A 7-tap transverse analog-FIR filter in 0.12 um CMOS for equalization of 10Gb/s fiber-optic data systems", Reynolds, S.; Pepeljugoski, P.; Schaub, J.; Tierno, J.; Beisser, D., IEEE Solid-State Circuits Conference, 2005. Digest of Technical Papers. ISSCC. 2005 pp. 330-601 vol. 1.

"A 2.5- to 3.5-Gb/s Adaptive FIR Equalizer with Continuous-Time Wide Bandwidth Delay Line in 0.25mm CMOS,", X. F. Lin, J. Liu, H. Lee, and H. Liu, IEEE Journal of Solid-State Circuits, vol. 41, pp. 1908-1918, Aug. 2006.

"10+ gb/s 90-nm CMOS serial link demo in CBGA package", Rylov, S.; Reynolds, S.; Storaska, D.; Floyd, B.; Kapur, M.; Zwick, T.; Gowda, S.; Sorna, M., Solid-State Circuits, IEEE Journal of vol. 40, Issue 9, Sep. 2005 pp. 1987-1991.

* cited by examiner

*Primary Examiner*—David C Payne
*Assistant Examiner*—Brian J Stevens
(74) *Attorney, Agent, or Firm*—Law Office of Gerald Maliszewski; Gerald Maliszewski

(57) ABSTRACT

A system and method are provided for feed-forward equalization (FFE) in a transmission system. The method accepts a serial stream of input digital data signals. For each input data signal, a temporal sequence of signals is generated. Each of the signals in the temporal sequence is selectively shaped. Shaping map include varying the degree of amplification, modifying the slew rate, or varying the time delay. The contributions of the selectively shaped signals in the temporal sequence are then selectively weighted, and a summed output signal is transmitted.

6 Claims, 9 Drawing Sheets

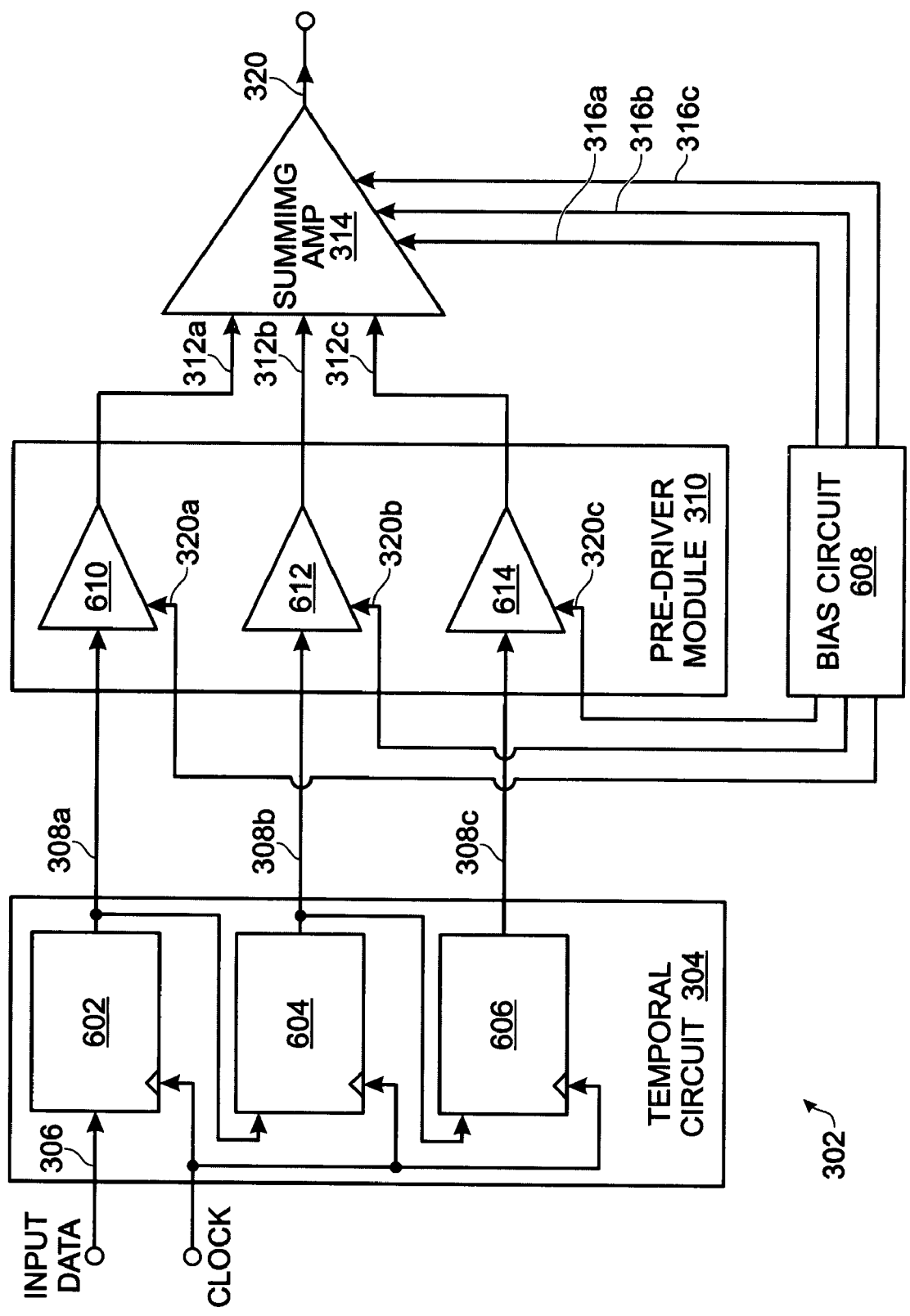

CURRENT MODE LOGIC MULTI-TAP FEED-FORWARD EQUALIZER

BACKGROUND OF THE INVENTION

1. Field of the Invention

This invention generally relates to physical layer (PHY) communication circuitry and, more particularly, to a system and method for using a current mode logic (CML) summing amplifier with multiple taps as feed-forward equalizer (FFE) in high speed data transmission to compensate for losses in the transmission medium.

2. Description of the Related Art

FIG. 1 is a diagram illustrating a high speed data transmission system (prior art). The data channel may be a printed circuit board (PCB) trace and include connectors and vias on the PCB board, or a length of transmission line to connect a receiver. Significant inter-symbol interference (ISI) may occur that degrades the received signal and causes errors, in the receiving data due to the dispersive behavior the channel from skin effect of metal, dielectric loss, cross-talk, and reflection due to impedance mismatches. A feed forward equalizer (FFE) and/or a decision feed-back equalizer (DFE) may be used for mitigating the problem. A feed-forward equalizer is often used in a transmitter.

FIG. 2 depicts a transversal filter FFE equalizer (prior art). The FFE consists of multiple distributed gain stages with the same number of delay taps. The delay is normally a fractional of the bit period and may be realized with either passive or active elements. In high speed data transmission, this type of FFE circuitry has the disadvantage of consuming power. It is difficult to control the delay elements, especially when more stage/taps are needed to compensate multiple post-cursor ISI. Another disadvantage is that this type of FFE cannot compensate for pre-cursor ISI.

FIG. 3 is block diagram depicting a FFE with a half-symbol spaced finite impulse response (FIR) (prior art). The input of the data stream is supplied to an 8-stage shift register, which forms the tapped delay line of the FIR filter. The shift register operates at a full-rate clock and consists of transparent latches with even and odd stages using opposite clock polarity, so each stage creates a delay of a half clock period. The eight delayed copies of the input are then multiplied by eight FIR filter coefficients and summed together as follows. First, digital signals from individual taps are supplied to exclusive-or (XOR) gates along with the respective polarity bits of the tap coefficients P0-P7. The polarity-adjusted digital signals then drive individual buffer stages with programmable tail currents. These stages generate differential output currents, each being a product of the tail current (representing the magnitude of the tap coefficient) and a polarity-adjusted delayed copy of the input data. This operation generates FIR filter partial sums. Finally, the differential currents from individual stages are summed together at a common differential resistive load, providing the final output of the FIR filter.

This FFE configuration uses latching circuitry to create half-symbol spaced delays, and even more stages are needed for more dispersive channels. XOR gates in the high speed signal path degrade the signal and add jitter to the data. Also, simple coefficient control differential circuits may not provide the right signal level and shape for optimal performance.

It would be advantageous if an FFE could operate with full rate and symbol-spaced delay, using control coefficients to shape signals with swing and slew, and provide optimal equalization performance, to compensate for pre-cursor and post-cursor inter-symbol interference in high dispersive channels.

SUMMARY OF THE INVENTION

Accordingly, a method is provided for feed-forward equalization in a transmission system. The method accepts a serial stream of input digital data signals. For each input data signal, a temporal sequence of signals is generated. Each of the signals in the temporal sequence is selectively shaped. Shaping may include varying the degree of amplification, modifying the slew rate, or varying the time delay. The contributions of the selectively shaped signals in the temporal sequence are then selectively weighted, and a summed output signal is transmitted.

For example, each input signal can be used to generate a sequence of past, present, and future representations of the signal. Then, accepting the serial stream of input data signals may entail accepting the serial stream of input data signals at a clock rate, and generating the temporal sequence of signals may includes the substeps of: gating input data signals through a first register at the clock rate to supply future signals; gating future signal through a second register at the clock rate to supply present signals; and, gating present signal through a third register at the clock rate to supply past signals.

The method may be enabled using differential signals, so the weighting the contributions of the past, present, future signals includes establishing a 3-tap differential summing amplifier with a common differential output and parallel differential present, past, and future taps. Each of the differential taps is enabled in response to accepting a corresponding selectively shaped past, present, and future signal. Each of the differential taps is weighted in response to using a corresponding past, present, and future weighting signal to control current flow through the tap.

Additional details of the above-described method and a transmitter with a system for using feed-forward equalization are provided below.

BRIEF DESCRIPTION OF THE DRAWINGS

FIG. 7 is a schematic block diagram depicting a more detailed example of the feed-forward equalizer of FIG. 4.

DETAILED DESCRIPTION

Figure 4:
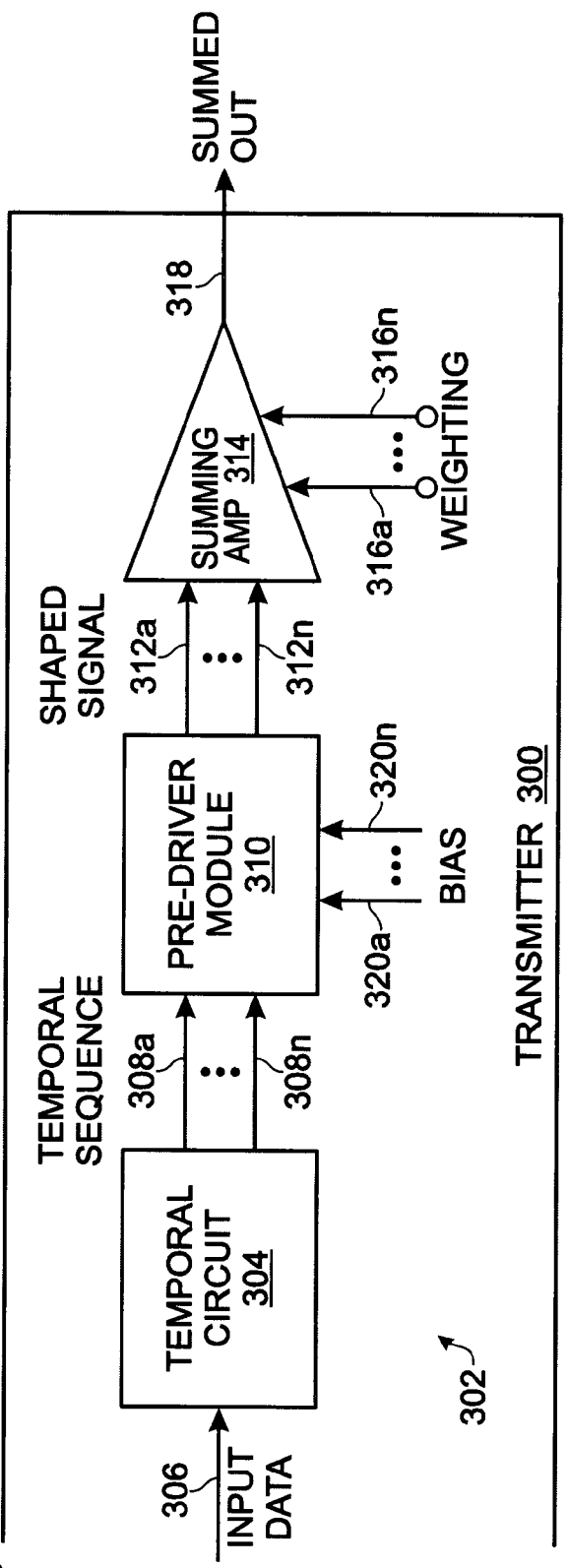
FIG. 4 is a schematic block diagram of a transmitter with a system for feed-forward equalization.

FIG. 4 is a schematic block diagram of a transmitter 300 with a system for feed-forward equalization. The system 302 comprises a temporal circuit 304 having an input on line 306 to accept a serial stream of input digital data signals, and outputs on line 308 to supply a temporal sequence of signals for each input data signal. Here, n represents the number of signals in a temporal sequence.

Figure 5:
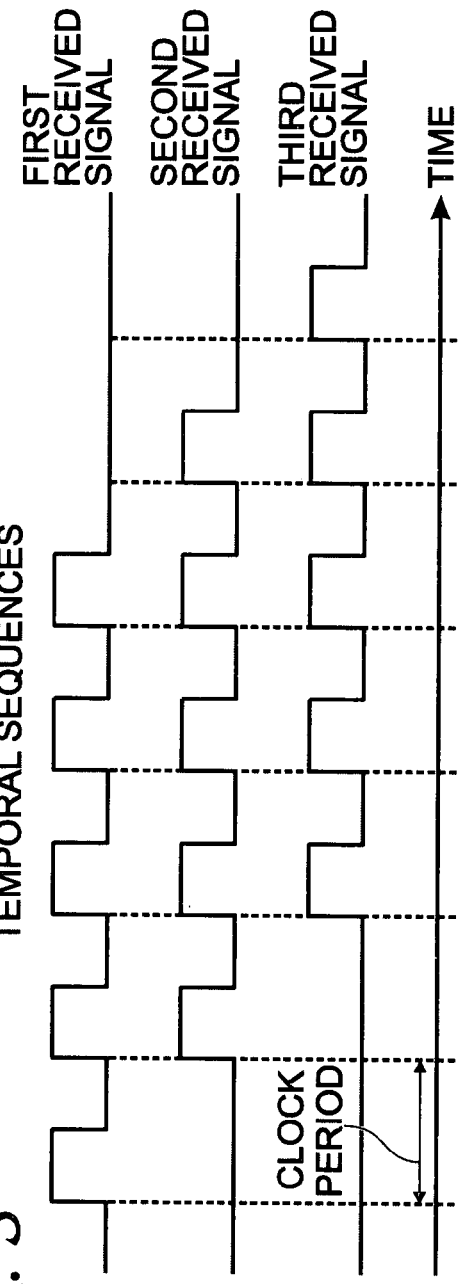
FIG. 5 is a diagram depicting a temporal sequence of signals associated with three consecutively received input data signals.

FIG. 5 is a diagram depicting a temporal sequence of signals associated with three consecutively received input data signals. A temporal sequence of signals is a presentation of an input signal with multiple delayed representations. For example, an input digital "1" value can be represented as a series of "1" values, where each "1" value is delayed from the next by one clock cycle. Although the temporal series is shown as consisting of 5 values in this example, the invention is not limited to any particular value. For simplicity, each of the three consecutive input data signals is shown as a "1" value.

Returning to FIG. 4, a pre-driver module 310 has inputs on line 308 to accept the temporal sequence of signals and outputs on line 312 to supply selectively shaped signals in the temporal sequence. The pre-driver module 310 permits the first value, for example, in a temporal series to be shaped differently from the second value. Selectively shaping signals in the temporal sequence may involve adjusting the level of amplifying, controlling delay, or modifying slew rate. However, the adjustment of one shaping feature may also result in modifications to the other features. Since n signals are received on lines 308a through 308n, n signals are supplied on lines 312a through 312n. In, one aspect, the signals are shaped in response to bias signals received on line 320. Since there are n signals to shape, there are n bias signals on lines 320a through 320n.

A summing amplifier 314 has inputs on line 312 to accept the selectively shaped signals in the temporal sequence. The summing amplifier selectively weights the contributions of the shaped signals in response to weighting signals received on line 316, and transmits a summed output signal on line 318. Since there are n shaped signals, there are n weighting signals on lines 316a through 316n. Note: the summed output signal may be transmitted via a connector medium, for example, or as another example, transmitted via conductive traces to a different region of the same printed circuit board (PCB).

Figure 1:
FIG. 1 is a diagram illustrating a high speed data transmission system (prior art).
Figure 2:
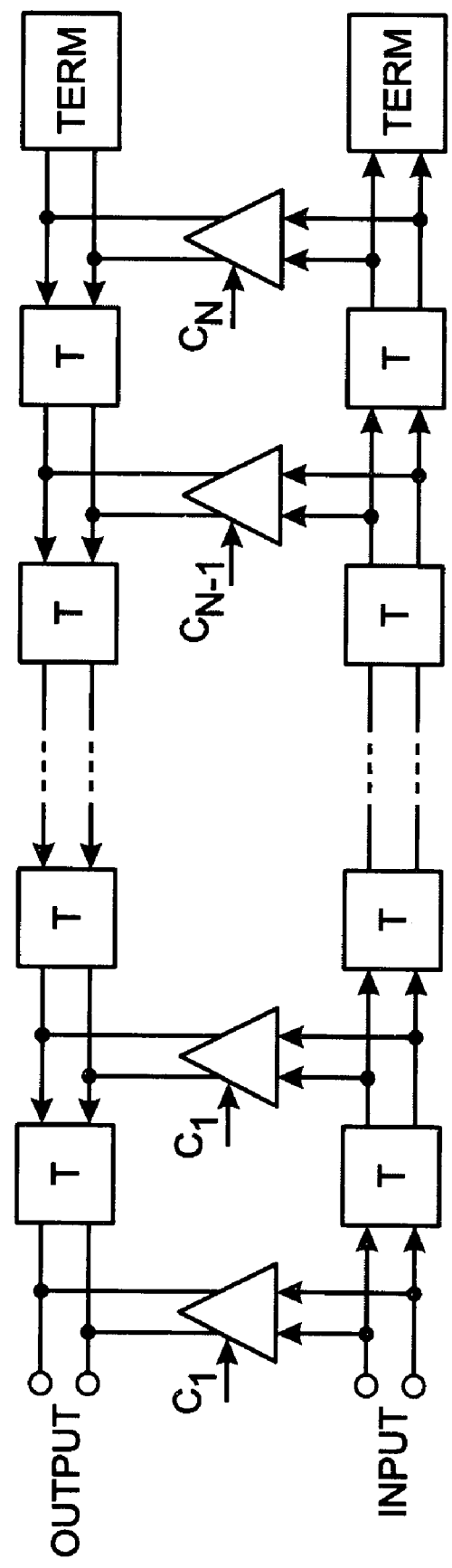
FIG. 2 depicts a transversal filter FFE equalizer (prior art).
Figure 3:
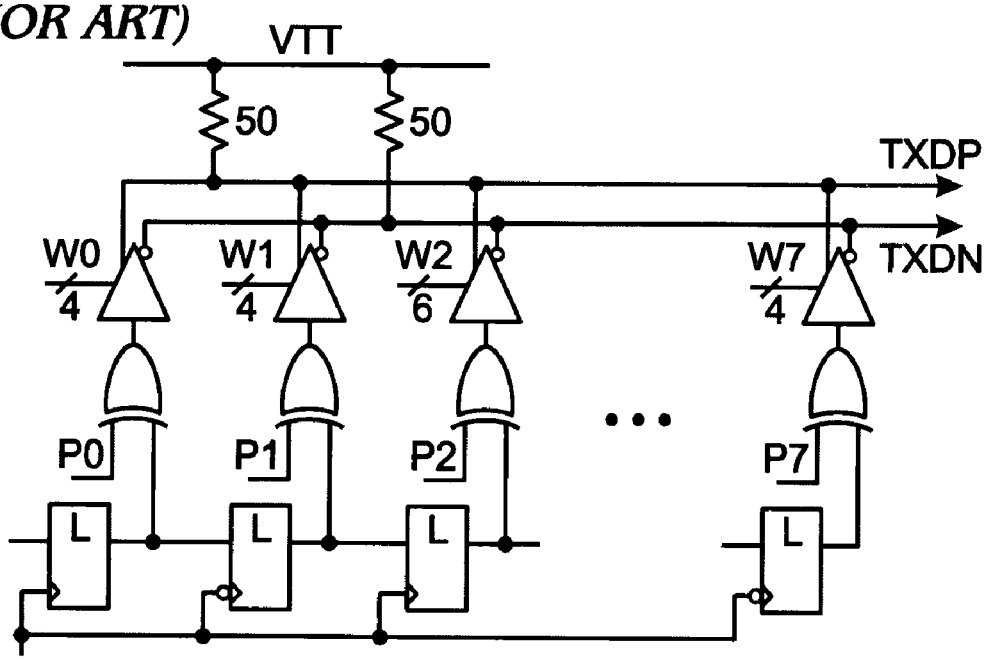
FIG. 3 is block diagram depicting a FFE with a half-symbol spaced finite impulse response (FIR) (prior art).
Figure 6:
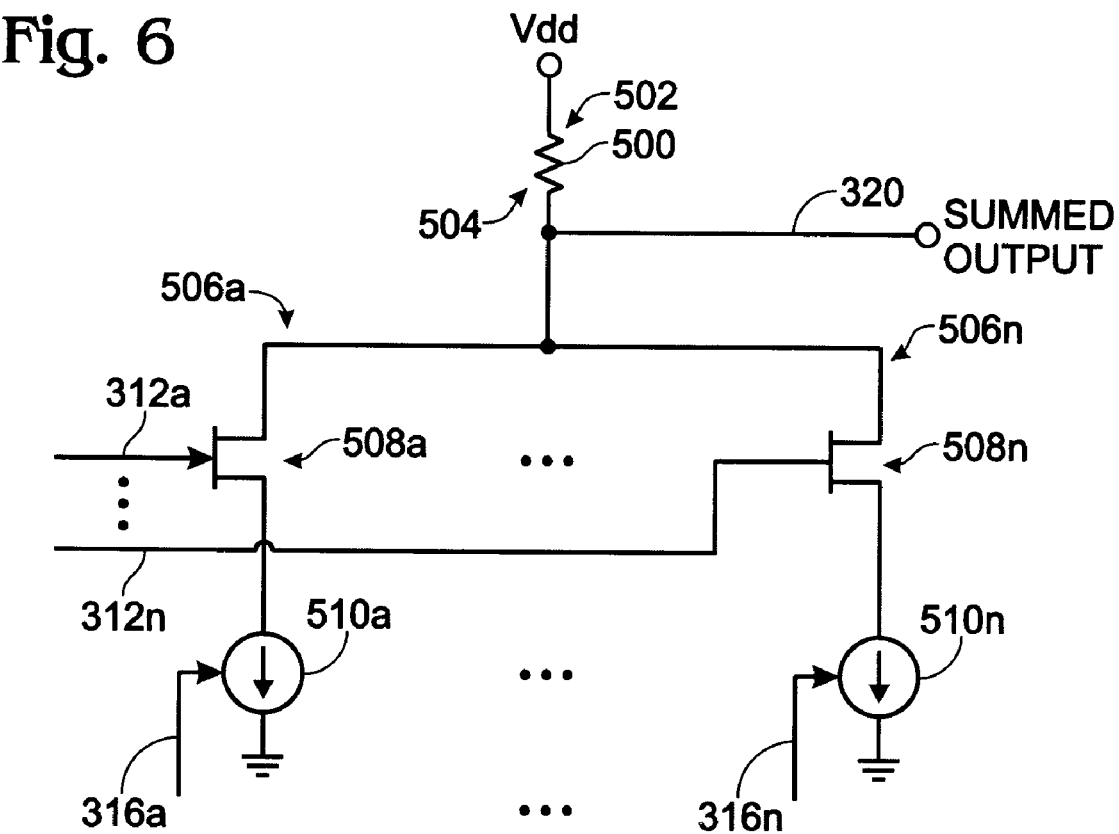
FIG. 6 is a schematic diagram depicting a fundamental representation of the summing amplifier of FIG. 4.

FIG. 6 is a schematic diagram depicting a fundamental representation of the summing amplifier of FIG. 4. The summing amplifier 314 includes a resistor 500 with a first end 502 connected to a first voltage source (Vdd), and a common output on line 320 connected to, a second end of the resistor 504. There is a parallel tap for each shaped signal in the temporal sequence. Each tap 506a through 506n is connected in common to the second end 504 of the resistor and weighted in response to accepting a corresponding weighting signal on lines 316a through 316n, to control current flow through the tap. Here, each tap is represented by a FET is series with a current source. For example, the shaped signal on line 312a enables FET 508a and current (weighting) through the tap is controlled using the weighting signal on line 316a. Other ways of enabling taps with the same functionality as described above would be known by those with skill in the art. The invention is not limited to just this example of a single-ended signal summing amplifier.

FIG. 7 is a schematic block diagram depicting a more detailed example of the feed-forward equalizer of FIG. 4. The temporal circuit 304 includes an input on line 600 to accept a clock having a clock rate. A future register 602 has an input on line 306 to accept the serial stream of input data signals, and on input on line 600 accepts the clock. The future register 602 gates the input data signals at the clock rate to supply future signals on line 308a.

A present register 604 has an input on line 308a to accept the future signals, and an input on line 600 to accept the clock. The present register 604 gates the future signals at the clock rate to supply the present signals on line 308b. A past register 606 has an input on line 308b to accept the present signals, and an input on line 600 to accept the clock. The past register 606 gates the present signals at the clock rate to supply the past signals on line 308c.

A bias circuit 608 has outputs on lines 320a, 320b, and 320c to supply past, present, and future bias signals, respectively. The pre-driver module 310 includes a future pre-driver 610 to accept future signals on line 308a and the future bias signal on line 320a. The future pre-driver 610 supplies selectively shaped future signals on line 312a in response to the future bias signal. A present pre-driver 612 accepts present signals on line 308b and the present bias signal on line 320b. The present pre-driver 612 supplies selectively shaped present signals on line 312b in response to the present bias signal. A past pre-driver 614 accepts past signals on line 308c and the past bias signal on line 320c. The past pre-driver 614 supplies selectively shaped past signals on line 312c in response to the past bias signal.

The summing amplifier 314 has inputs on lines 312a, 312b, and 312c to accept the past, present, and future bias signals, respectively. The summing amplifier 314 selectively weights the selectively shaped future signals in response to the future weighting signal on line 316a. The selectively shaped present signals are weighted in response to the present weighting signal on line 316b, and the selectively shaped past signal is weighed in response to the past weighting signal on line 316c.

Figure 8:
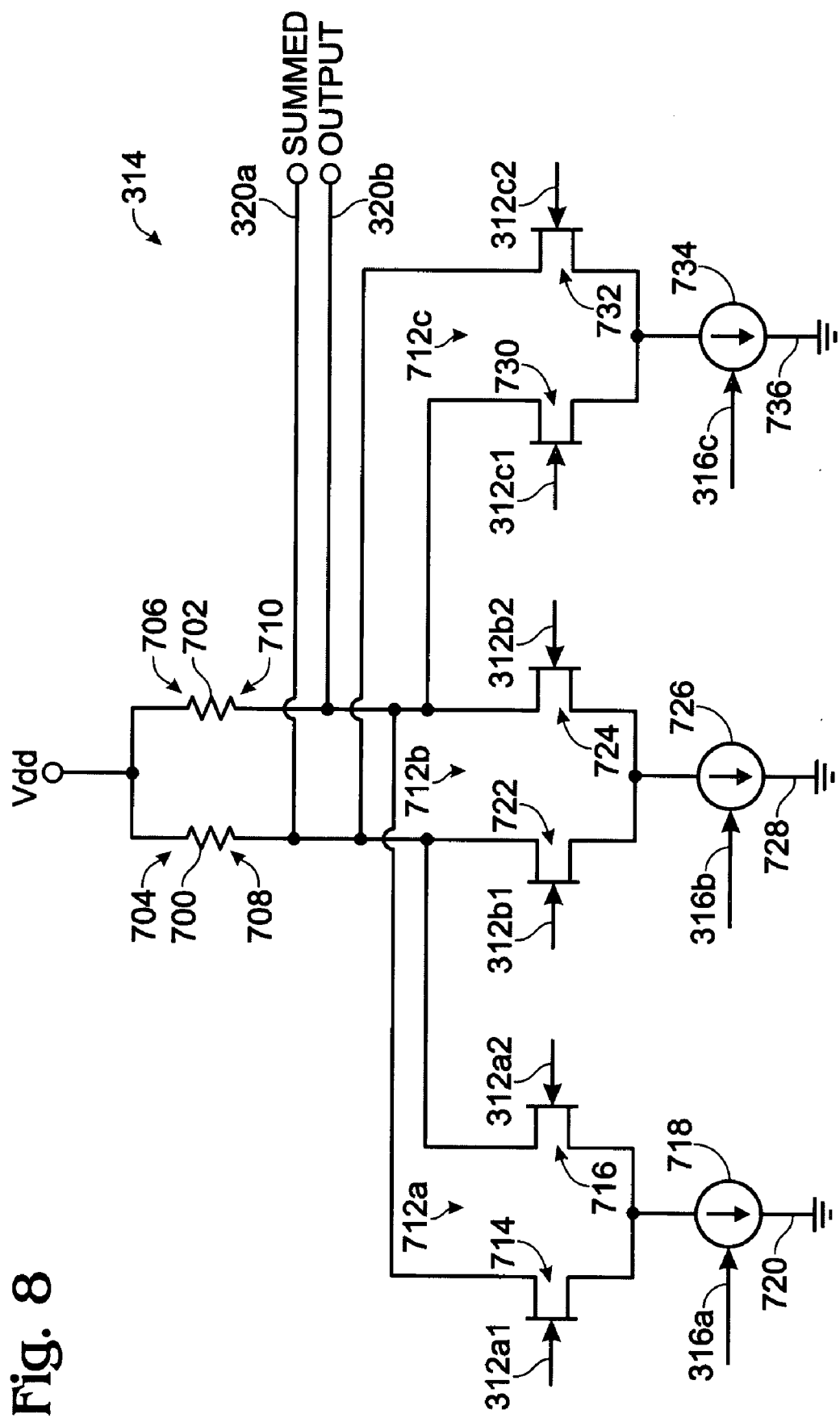
FIG. 8 is a schematic diagram depicting a 3-tap example of a differential signal summing amplifier.

FIG. 8 is a schematic diagram depicting a 3-tap example of a differential signal summing amplifier. In some aspects, the temporal circuit accepts a serial stream of differential input data signals and supplies differential past, present, and future signals. Likewise, the pre-driver module supplies differentially shaped past, present, and future signals, and the summing amplifier transmits a summed differential output signal.

One version of a differential summing amplifier includes a differential pair of resistors 700 and 702 with first ends 704 and 706, respectively, connected to a first voltage source (Vdd). A common differential output 320a and 320b is connected to a second end 708 and 710 of resistor 700 and 702, respectively. There are parallel past, present, and future differential taps 712a, 712b, and 712c, respectively. Each tap is connected in common to the second ends 708/710 of the corresponding resistor 700/702 from the pair. Here, the taps are shown enabled a differential amplifiers and controllable current sources.

The future tap 712a includes a pair of differential transistors 714 and 716 having gates to accept the selectively shaped differential future signals 312a1 and 312a2, respectively. Transistors 714 and 716 have sources, and they have drains connected to the second ends 708 and 710 of the resistor 700 and 702, respectively. A future current bias circuit 718 has an input on line 316a to accept the future weighting signal, an input connected to the sources of the pair of differential transistors 714/716, and an output connected to the second voltage source (e.g., ground) on line 720. There are many types of current bias and control circuits that are known by those with skill in the art that can be adapted for this function.

The present tap 712b includes a pair of differential transistors 722 and 724 having gates to accept the selectively shaped differential present signals 312b1 and 312b2, respectively. The transistors 722/724 have sources, and they have drains connected to the second ends 708 and 710 of the resistor 700 and 702, respectively. A present current bias circuit 726 has an input on line 316b to accept the present weighting signal, an input connected to the sources of the pair of differential transistors 722/724, and an output connected to the second voltage source (e.g., ground) on line 728.

The past tap 712c includes a pair of differential transistors 730 and 732 having gates to accept the selectively shaped differential past signals 312c1 and 312c2, respectively. The transistors 730/732 have sources, and they have drains connected to the second ends 708 and 710 of the resistor 700 and 702, respectively. A past current bias circuit 734 has an input on line 316c to accept the past weighting signal, an input connected to the sources of the pair of differential transistors 730/732, and an output connected to the second voltage source (e.g., ground) on line 734.

Figure 9:
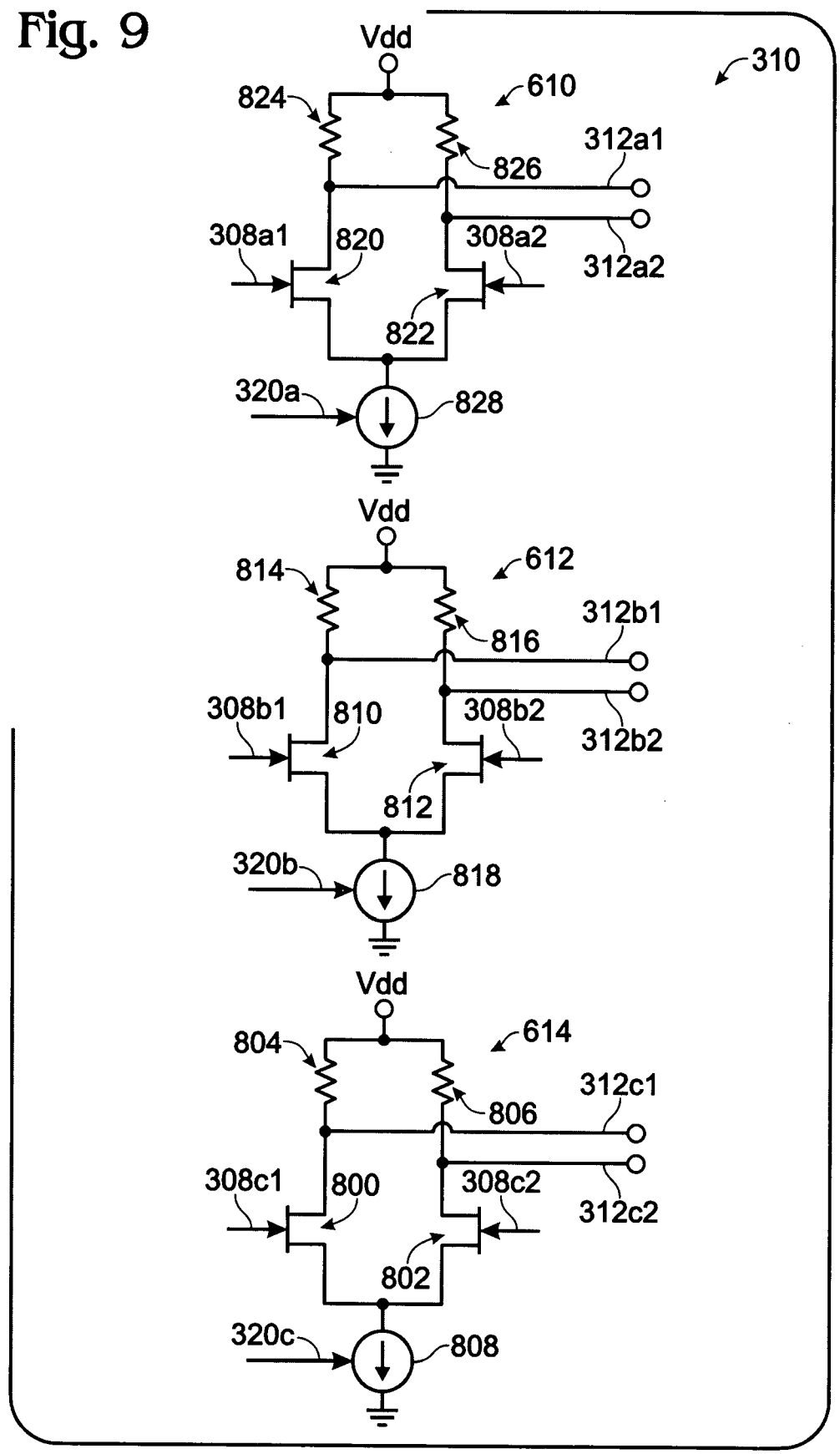
FIG. 9 is a schematic drawing depicting a more detailed example of the pre-driver module of FIG. 7.

FIG. 9 is a schematic drawing depicting a more detailed example of the pre-driver module 310 of FIG. 7. In one aspect, the past pre-driver 614 includes a pair of differential transistors 800 and 802 having gates to accept differential past signals 308c1 and 308c2, respectively. The transistors 800/802 have sources, and they have drains connected to the first voltage source (Vdd) through an interposing resistor pair 804 and 806. A pre-driver past current bias circuit 808 has an input on line 320c to accept the past bias signal, an input connected to the sources of the differential transistors 800 and 802, and an output connected to the second voltage source (e.g., ground).

The present pre-driver 612 includes a pair of differential transistors 810 and 812 having gates to accept differential present signals on line 308b1 and 308b2, respectively. The transistors 810/812 have sources, and they have drains connected to the first voltage source through an interposing resistor pair 804 and 806. A pre-driver present current bias circuit 808 has an input on line 320b to accept the present bias signal, an input connected to the sources of the pair of differential transistors 810 and 812, and an output connected to the second voltage source.

The future pre-driver 610 includes a pair of differential transistors 820 and 822 having gates to accept differential future signals on lines 308a1 and 308a2, respectively. The transistors 820/822 have, sources, and drains connected to the first voltage source through an interposing resistor pair 824 and 826, respectively. A pre-driver future current bias circuit 828 has an input on line 320a to accept the future bias signal, an input connected to the sources of the pair of differential transistors 820/822, and an output connected to the second voltage source.

Although each pre-driver circuit has been depicted with a single stage of amplification, it should be understood that a pre-driver may be enabled with multiple stages of amplifications. Different circuit designs with the same functionality could be designed with those with skill in the art.

Functional Description

Figure 10:
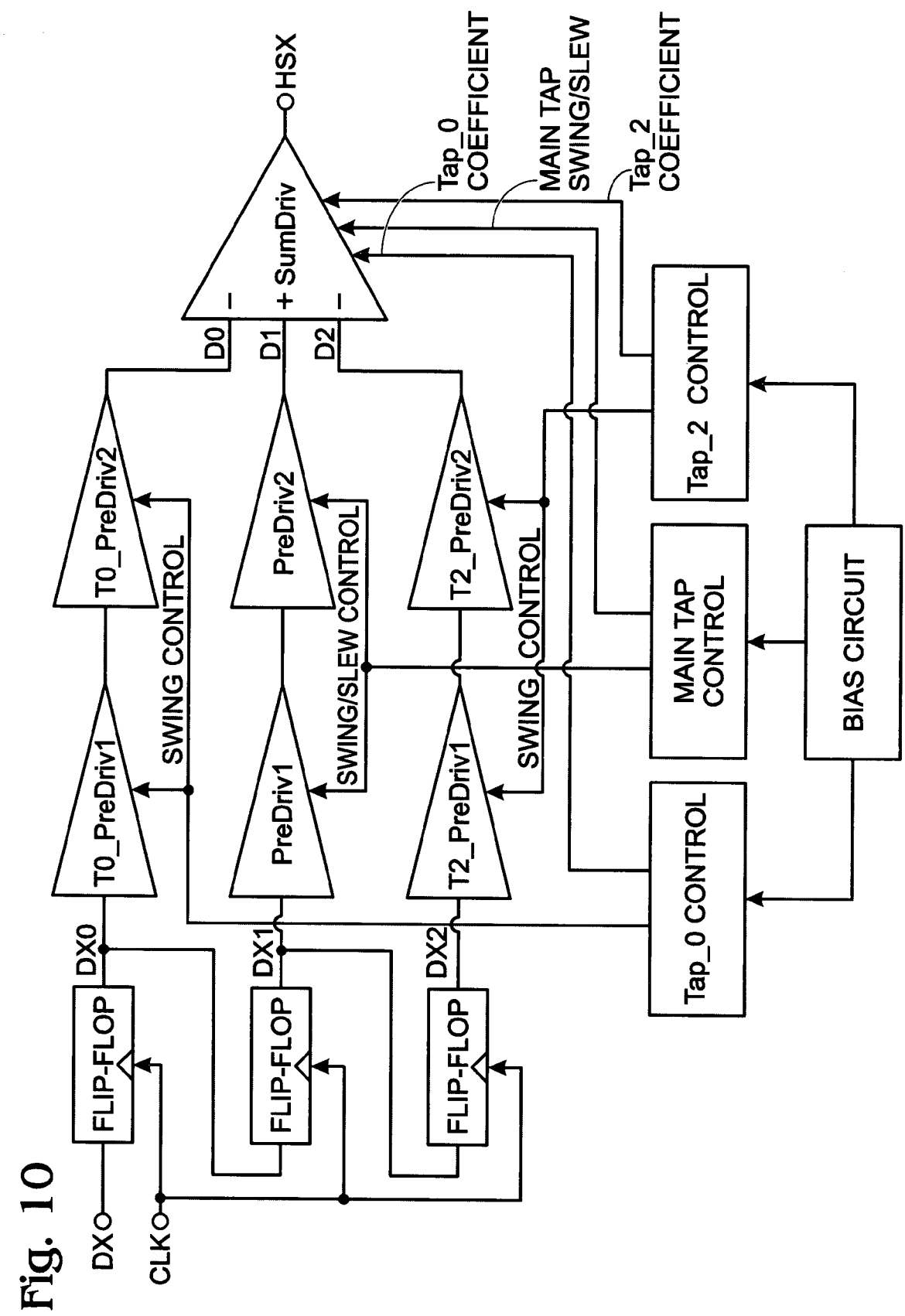
FIG. 10 is a schematic block diagram depicting another variation of the FFE of FIG. 4.

FIG. 10 is a schematic block diagram depicting another variation of the FFE of FIG. 4. In this aspect, the FFE consists of 4 main blocks: (1) the bit delay circuit, which provides the past bits, present bits, and future bits using high speed shift registers (e.g., flip-flops); (2) the pre-drive stages to reshape the signal waveforms; (3) the summing amplifier or summing driver to process the different bit information with weighted coefficients; and (4) the bias and control circuits for setting the tap coefficients, and swing and slew control of the pre-drive stages and summer circuits. A 3-tap architecture is shown as an example. This circuit may be used to receive the 3 pairs of 10 gigabyte per second (Gbs) signals (past, present, future bits) from the shift register circuit. Then, the bits are amplified and reshaped through 3 amplifier paths to drive the summing amplifier to perform feed-forward equalization. The output of the summing may be used, for example, to drive a 100 Ohm differential transmission line. The bias circuit and tap control circuitry are used to control each of the tap coefficients and swing/slew.

Differential current mode logic (CML) circuits can be used in the implementation of all the circuit clocks used with the flip-flops, pre-drivers, and the summing amplifiers. Inductor peaking may be used to extend the bandwidth and, therefore, enhance the performance, as well as reduce the power. CML circuits and inductive peaking are design techniques well understood by those with skill in the art.

Figure 11:
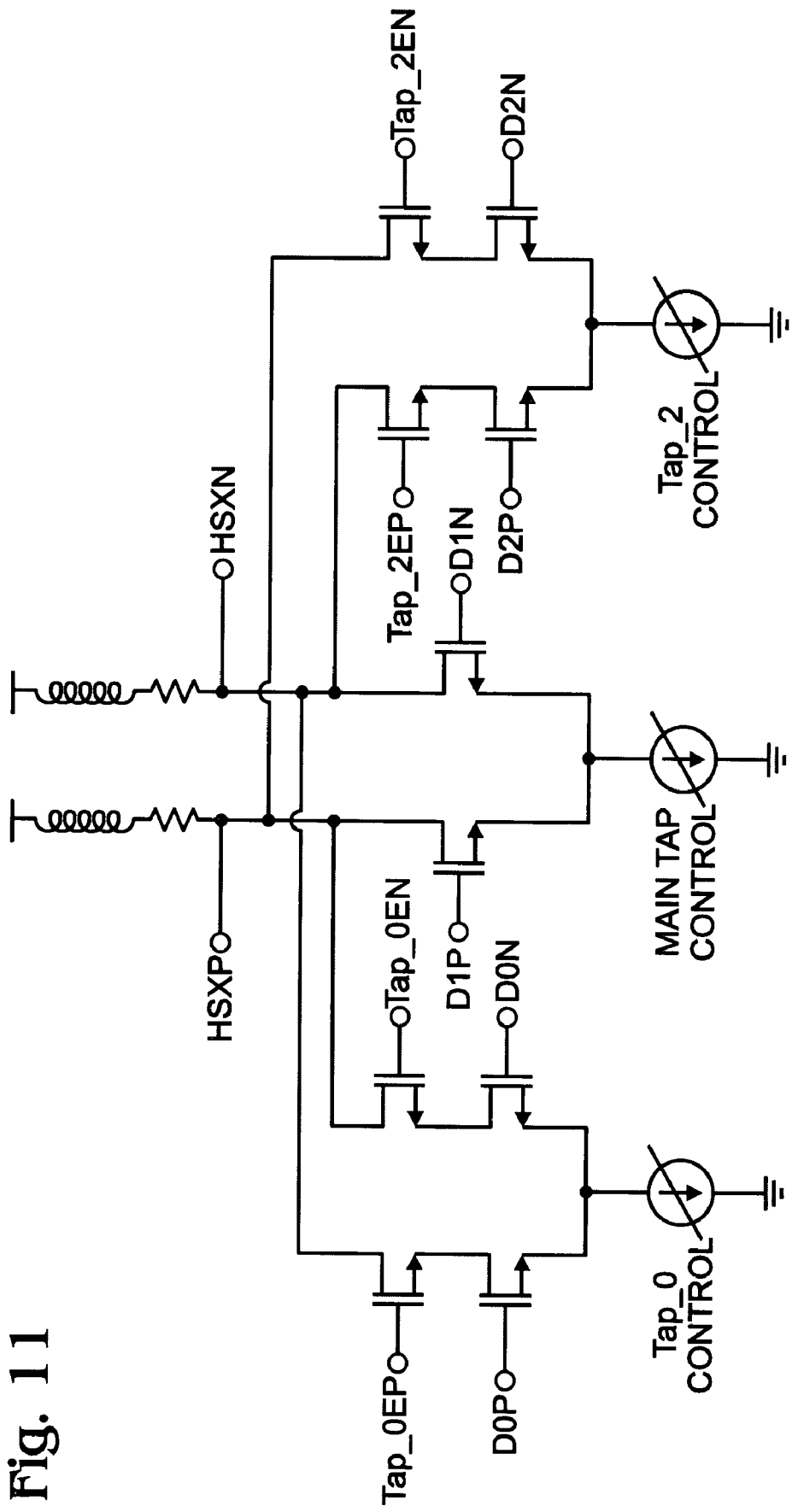
FIG. 11 is a schematic drawing depicting another variation of the summing amplifier.

FIG. 11 is a schematic drawing depicting another variation of the summing amplifier. Specifically, a 3-tap CML summing amplifier is shown. 3 pairs of differential input signals (D0P/D0N, D1P/D1N, and D2P/D2N) are summed though the 3-differential amplifiers with common loading. Inductors may be used for performance enhancement. The two side pairs (Tap—0EP/Tap—0EN and Tap—2EP/Tap—2EN) may be used as cascade switches to enable a non-FFE mode of summing amplifier operation. The weighting of the 3-tap amplifier pairs is controlled by the tap-control circuitry and is modified to obtain the desired tap control coefficient, as well as the slew/swing requirements.

Figure 12:
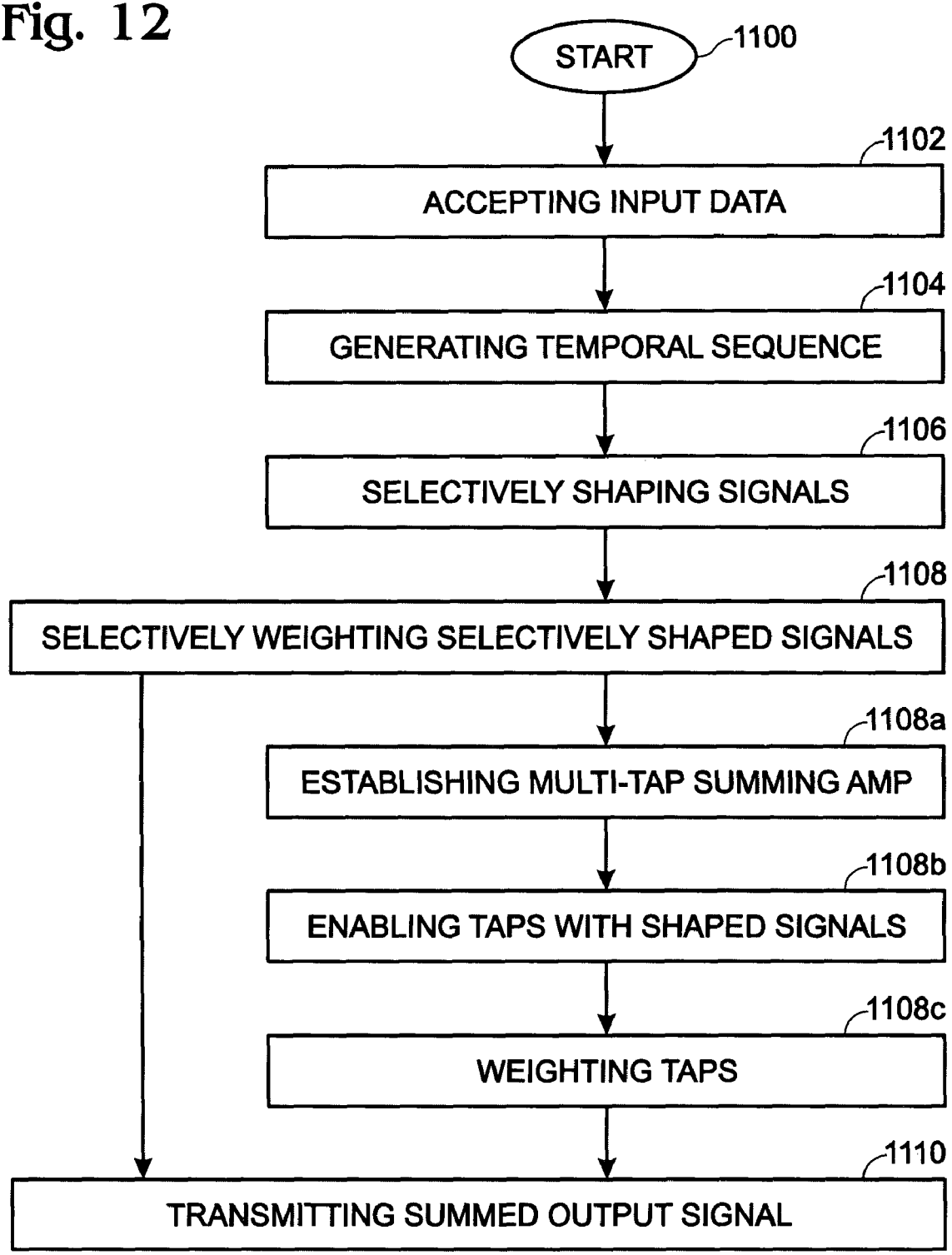
FIG. 12 is a flowchart illustrating a method for feed-forward equalization in a data transmission system.

FIG. 12 is a flowchart illustrating a method for feed-forward equalization in a data transmission system. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 1100.

Step 1102 accepts a serial stream of input digital data signals. For each input data signal, Step 1104 generates a temporal sequence of signals. Step 1106 selectively shapes each of the signals in the temporal sequence. For example, Step 1106 may include a process such as adjusting amplification, controlling delay, or modifying slew rate. Step 1108 selectively weights the contributions of the selectively shaped signals in the temporal sequence. Step 1110 transmits a summed output signal.

In one aspect, selectively weighting the contributions of the shaped signals in the temporal sequence in Step 1108 includes substeps. Step 1108a establishes a multi-tap summing amplifier with a common output and a parallel tap for each shaped signal in the temporal sequence. Step 1108b enables each of the taps in response to accepting a corresponding shaped signal. Step 1108c weights each of the taps in response to accepting a corresponding weighting signal, to control current flow through the tap.

In another aspect, accepting the serial stream of input data signals in Step 1102 includes accepting the serial stream of input data signals at a clock rate. Then, generating the temporal sequence of signals includes: gating input data signals through a first register at the clock rate to supply future signals; gating future signal through a second register at the clock rate to supply present signals; and, gating present signal through a third register at the clock rate to supply past signals.

In this aspect, selectively shaping signals in the temporal sequence in Step 1106 includes: shaping future signals in response to a future bias signal; shaping present signals in response to a present bias signal; and, shaping past signals in response to a past bias signal. Likewise, selectively weighting the contributions of the shaped signals in the temporal sequence (Step 1108) includes: weighting future signals in response to the future weighting signal; weighting present signals in response to the present weighting signal; and, weighting past signals in response to the past weighting signal.

In a different aspect, accepting the serial stream of input data signals in Step 1102 includes accepting a serial stream of differential input data signals. Then, generating the temporal sequence of past, present, and future signals in Step 1104 includes generating differential past, present, and future signals. Likewise, selectively shaping each of the past, present, and future signals in Step 1106 includes differentially amplifying the past, present, and future signals. Selectively weighting the contributions of the past, present, and future signals in Step 1108 includes differentially weighting the contributions of the past, present, future signals, and Step 1110 transmits a summed differential output signal.

In a related aspect, differentially weighting the contributions of the past, present, future signals includes Step 1108a establishing a 3-tap differential summing amplifier with a common differential output and parallel differential present, past, and future taps. Step 1108b enables each of the differential taps in response to accepting a corresponding selectively shaped past, present, and future signal, and Step 1108c weights each of the differential taps in response to using a corresponding past, present, and future weighting signal to control current flow through the tap.

A system and method for FFE have been presented. Particular circuit designs have been used as examples to illustrate the invention. However, the invention is not limited to just these examples. Other variations and embodiments of the invention will occur to those skilled in the art.

We claim:

1. In a data transmission system, a method for feed-forward equalization, the method comprising:
   accepting a serial stream of differential input digital data signals at a clock rate;
   for each differential input data signal, generating a temporal sequence of signals as follows:
      gating differential input data signals through a first register at the clock rate to supply differential future signals;
      gating differential future signal through a second register at the clock rate to supply differential present signals;
      gating differential present signal through a third register at the clock rate to supply differential past signals;
   selectively shaping each of the signals in the temporal sequence as follows:
      differentially amplifying future signals in response to a future bias signal;
      differentially amplifying present signals in response to a present bias signal;
      differentially amplifying past signals in response to a past bias signal;
   selectively weighting the contributions of the selectively shaped signals in the temporal sequence as follows:
      weighting differential future signals in response to a future weighting signal;
      weighting differential present signals in response to a present weighting signal;
      weighting differential past signals in response to a past weighting signal; and,
   transmitting a summed differential output signal.

2. The method of claim 1 wherein differentially weighting the contributions of the past, present, future signals includes:
   establishing a 3-tap differential summing amplifier with a common differential output, and parallel differential present, past, and future taps;
   enabling each of the differential taps in response to accepting a corresponding selectively shaped past, present, and future signal; and,
   weighting each of the differential taps in response to using a corresponding past, present, and future weighting signal to control current flow through the tap.

3. A transmitter with a system for feed-forward equalization, the system comprising:
   a temporal circuit including:
      an input to accept a serial stream of differential input digital data signals;
      an input to accept a clock having a clock rate;
      a future register having inputs to accept the serial stream of differential input data signals and the clock, the future register gating the input data signals at the clock rate to supply differential future signals;
      a present register having inputs to accept the differential future signals and the clock, the present register gating the future signals at the clock rate to supply differential present signals;
      a past register having inputs to accept the present signals and the clock, the past register gating the present signals at the clock rate to supply past signals;
   a bias circuit having outputs to supply past, present, and future bias signals;
   a pre-driver module including:
      a future pre-driver to accept the differential future signals and the future bias signal, the future pre-driver supplying selectively shaped differential future signals in response to the future bias signal;
      a present pre-driver to accept the differential present signals and the present bias signal, the present pre-driver supplying selectively shaped differential present signals in response to the present bias signal;
      a past pre-driver to accept differential past signals and the past bias signal, the past pre-driver supplying selectively shaped differential past signals in response to the past bias signal; and,
   a summing amplifier having inputs to accept the differential past, present, and future weighting signals, the summing amplifier selectively weighting the selectively shaped differential future signals in response to the future weighting signal, the selectively shaped differential present signals in response to the present weighting signal, and the selectively shaped differential past signal in response to the past weighting signal, the summing amplifier having an output to supply a summed differential output signal.

4. The system of claim 3 wherein the summing amplifier includes:
   a differential pair of resistors with first ends connected to a first voltage source;
   a common differential output connected to a second end of a corresponding resistor from the pair; and,
   parallel past, present, and future differential taps, each tap connected in common to the second ends of the corresponding resistor from the pair.

5. The system of claim 4 wherein the past tap includes:
   a first pair of differential transistors having gates to accept the selectively shaped differential past signals, sources, and drains connected to the second ends of the corresponding resistor from the pair;
   a past current bias circuit having an input to accept the past weighting signal, an input connected to the sources of the first pair of differential transistors, and an output connected to a second voltage source;

wherein the present tap includes:
- a second pair of differential transistors having gates to accept the selectively shaped differential present signals, sources, and drains connected to the second ends of the corresponding resistor from the pair;
- a present current bias circuit having an input to accept the present weighting signal, an input connected to the sources of the second pair of differential transistors, and an output connected to the second voltage source;

wherein the future tap includes:
- a third pair of differential transistors having gates to accept the selectively shaped differential future signals, sources, and drains connected to the second ends of the corresponding resistor from the pair;
- a future current bias circuit having an input to accept the future weighting signal, an input connected to the sources of the third pair of differential transistors, and an output connected to the second voltage source.

6. The system of claim 3 wherein the past pre-driver includes:
- a fourth pair of differential transistors having gates to accept differential past signals, sources, and drains connected to the first voltage source through an interposing resistor pair;
- a pre-driver past current bias circuit having an input to accept the past bias signal, an input connected to the sources of the fourth pair of differential transistors, and an output connected to the second voltage source;

wherein the present pre-driver includes:
- a fifth pair of differential transistors having gates to accept differential present signals, sources, and drains connected to the first voltage source through an interposing resistor pair;
- a pre-driver present current bias circuit having an input to accept the present bias signal, an input connected to the sources of the fifth pair of differential transistors, and an output connected to the second voltage source;

wherein the future pre-driver includes:
- a sixth pair of differential transistors having gates to accept differential future signals, sources, and drains connected to the first voltage source through an interposing resistor pair;
- a pre-driver future current bias circuit having an input to accept the future bias signal, an input connected to the sources of the sixth pair of differential transistors, and an output connected to the second voltage source.

* * * * *